United States Patent
Bastioli et al.

(10) Patent No.: US 7,196,157 B2
(45) Date of Patent: *Mar. 27, 2007

(54) BIODEGRADABLE SATURATED/UNSATURATED THERMOPLASTIC POLYESTERS

(75) Inventors: Catia Bastioli, Novara (IT); Tiziana Milizia, Novara (IT)

(73) Assignee: Novamont S.p.A., Novara (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/968,949

(22) Filed: Oct. 21, 2004

(65) Prior Publication Data

US 2005/0059795 A1    Mar. 17, 2005

Related U.S. Application Data

(63) Continuation of application No. PCT/EP03/04196, filed on Apr. 22, 2003.

(30) Foreign Application Priority Data

Apr. 22, 2002  (IT)  ............................ MI2002A0866

(51) Int. Cl.
 *G08G 63/00*   (2006.01)

(52) U.S. Cl. ...................... 528/217; 428/373; 528/272; 528/294; 528/354; 528/361

(58) Field of Classification Search ................ 428/373; 528/271, 272, 294, 354, 361
See application file for complete search history.

(56) References Cited

U.S. PATENT DOCUMENTS 5,593,778 A * 1/1997 Kondo et al. ................ 428/373

* cited by examiner

*Primary Examiner*—Terressa Boykin
(74) *Attorney, Agent, or Firm*—Connolly, Bove, Lodge & Hutz, LLP

(57) ABSTRACT

Biodegradable aliphatic thermoplastic copolyesters of the saturated-unsaturated type, utilizable for the production of several types of articles such as films, sheets, nets, expanded molded products, and the like, and process for their production.

41 Claims, 1 Drawing Sheet

BIODEGRADABLE SATURATED/UNSATURATED THERMOPLASTIC POLYESTERS

This application is a Continuation of PCT/EP03/04196 filed Apr. 22, 2003 which in turn claims priority from Italian Application MI2002A000866, filed Apr. 22, 2002.

The present invention relates to biodegradable aliphatic thermoplastic copolyesters of the saturated-unsaturated type, useful for the production of various objects such as films, sheets, nets, expanded molded products, and the like, and the process for their production.

Biodegradable polyesters of the diacid/diol type are known in the literature. However, if used as plastics, said polymers are subject to several problems, such as the difficulty in reaching high molecular weights, poor tenacity, aging, high density and low compatibility with other polymers. There are known in particular (WO 00/55236) polyesters of the diacid/diol type in whose preparation process a small percentage (up to 10%) of aliphatic hydroxy acids is added. The teaching of the prior art, however, is specifically directed (page 4, $1^{st}$ paragraph) to the preparation of saturated aliphatic polyesters.

On the contrary, the copolyester according to the present invention is specifically directed to a molecular structure including at least one unsaturation.

Compared to the biodegradable polyesters of the prior art, the copolyester according to the invention includes as a characterizing element the presence of at least one unsaturation in the base monomers that makes it particularly suitable for use in subsequent upgrading processes or, anyhow, in molecule modification, for instance through reactive blending or introduction of different functional groups. Another characterizing element of the copolyester according to the invention is the presence of certain amounts of polyfunctional molecules as branching agents. From the description of the invention, it will be also evident that the copolyesters according to the invention can be conveniently used for the production of various types of objects.

The present invention relates to a biodegradable thermoplastic aliphatic copolyester of the saturated-unsaturated type obtained starting from dicarboxylic acids, diols, unsaturated acids of natural origin and a branching agent. In particular, the copolyester according to the invention comprises units deriving from the following monomers:

a) an aliphatic dicarboxylic acid, or esters thereof, with 2–20° C. atoms;
b) an aliphatic or cycloaliphatic diol, with 2–20° C. atoms;
c) an unsaturated acid of natural origin, or esters thereof;
d) a branching agent selected from molecules having at least three functional groups;

wherein said branching agent is present in an amount within the range of 0.05% to 1.5% moles based on the sum of the moles of the branching agent and the moles of the aliphatic dicarboxylic acid or esters thereof.

It has been surprisingly found that a copolyester comprising units derived from the monomers above shows superior properties when the units deriving from a molecule having at least three functional groups are present in the range from 0.05 to 1.5% by moles based on the aliphatic dicarboxylic acid and the molecule having at least three functional groups.

Examples of dicarboxylic acids are oxalic, malonic, succinic, glutaric, adipic, pimelic, suberic, azelaic, sebacic, undecandioic, dodecandioic, and brassylic acids.

Examples of diols include 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanedimethanol, propylene glycol, neopentylglycol, 2-methyl-1,3-propanediol, dianhydrosorbitol, dianhydromannitol, dianhydroiditol, cyclohexanediol, cyclohexanmethanediol.

Examples of unsaturated acids of natural origin are fatty acids, among which monounsaturated hydroxy acids, such as ricinoleic and lesquerolic acid, and mono-, or polyunsaturated monocarboxylic acids, such as oleic acid, erucic acid, linoleic acid, linolenic acid. The unsaturated acids of natural origin can be used either pure or mixed with other fatty acids, saturated or unsaturated. In particular they can be used as blends obtained from saponification or transesterification of the vegetable oils which they originate from. For instance, ricinoleic acid, in the form of methylricinoleate, can be used in a more or less pure form deriving from a transesterification reaction of castor oil with methanol, and subsequent removal of glycerin (a byproduct of the reaction) and excess methanol.

The concentration of the unsaturated acid of natural origin is up to 40% moles based on the sum of the moles of the unsaturated acid and the moles of the aliphatic dicarboxylic acid or esters thereof. Preferably, the unsaturated acid is present in an amount up to 15% by moles based on the sum of the moles of unsaturated acid and the moles of aliphatic dicarboxylic acid or esters thereof. More preferably, the unsaturated carboxylic acid is present in an amount of from 0.5 to 6% based on the sum of the moles of unsaturated acid and the moles of aliphatic dicarboxylic acid or esters thereof. It has been surprisingly found that when such more preferred amount of unsaturated acid is present, the copolyester according to the invention shows superior properties. In particular, films obtained from such copolyesters exhibit excellent optical properties and high water vapor transmission rate.

Examples of molecules having at least three functional groups include glycerol, pentaerythritol, trimethylolpropane, citric acid, densipolic acid, auripolic acid, epoxydized soybean oil and castor oil.

The copolyesters according to the invention have an inherent viscosity (as measured with an Ubbelhode viscometer for solutions in $CHCl_3$ at a concentration of 0.2 g/dl at 25° C.) within the range of 0.3 to 1.5 dl/g, preferably between 0.5 to 1.4 dl/g and more preferably from 0.7 to 1.3 dl/g.

The Melt Flow Rate (MFR) of the copolyesters according to the invention, when used for typical applications of plastics (for instance, film blowing, injection molding, foams, etc.), is within the range of 0.5 to 150 g/10 min, preferably 2 to 70 g/10 min, more preferably 3.0 to 50 g/10 min (measured at 150° C./2.16 kg, according to ASTM D1238).

Copolyesters according to the invention have a density measured with a Mohr-Westphal scale lower than 1.25 $g/cm^3$, preferably lower than 1.15 $g/cm^3$. It has also been surprisingly found that the copolyesters according to the invention are characterized by a low gel content, which makes them suitable for several applications, such as for instance film blowing. Typically, the gel fraction of such copolyesters determined with the method described in the examples is lower than 5%, preferably is lower than 2.5%, and more preferably is lower than 1%.

The copolyester according to the invention may comprise, besides the base monomers mentioned above, at least an hydroxy acid in an amount within the range of 0–50%, preferably 0–30% moles based on the moles of the aliphatic dicarboxylic acid. Examples of convenient hydroxy acids are glycolic acid, hydroxybutyric acid, hydroxycaproic acid, hydroxyvaleric acid, 7-hydroxyheptanoic acid, 8-hydroxycaproic acid, 9-hydroxynonanoic acid and lactic acid.

Besides, the copolyester according to the invention may comprise, while actually maintaining biodegradability, up to 50 moles %—based on the content of dicarboxylic acid and of possibly any other acid included in the chain—of a polyfunctional aromatic compound such as, for instance, phthalic acids, in particular terephthalic acid, bisphenol A, hydroquinone and the like.

Moreover, the copolyester according to the invention may be used in blends, obtained also by reactive extrusion either with copolyesters of the same type or with other biodegradable polyesters (e.g. polylactic acid, poly-ε-caprolactone, polyhydroxybutyrate, polyalkylensuccinates) or polymers other than polyesters; it may also be used in blends with polymers of natural origin, such as, e.g., starch, cellulose, chitosan alginates or natural rubbers. Starches and celluloses may be modified and among them there may be mentioned, for instance, starch or cellulose esters with a substitution level within the range of 0.2 to 2.5, hydroxypropylated starches, starches modified with fat chains. Starch may be used either destructurized, in a gel or in a filler form.

As mentioned above, compared to prior art biodegradable polyesters, the copolyester according to the invention has the particularly advantageous feature of including at least one unsaturation in the chain monomers; this makes it particularly suitable to subsequent upgrading or, anyhow, molecule modification processes, for instance through reactive blending or introduction of different functional groups. Another feature of the copolyester according to the invention is the presence of at least a tri-functional molecule capable of generating a certain degree of branching. The copolyester is also particularly suitable, possibly upon prior addition of suitable photo-initiators (such as e.g. benzoin, camphorquinone, tartaric acid and derivatives thereof), to undergo reticulation processes by UV and visible spectrum radiation.

The saturated/unsaturated copolyesters according to the invention have anyhow, as such, viscosity values that make them suitable for use, by appropriate control of the relevant molecular weight, in many practical applications such as films, injection molded products, extrusion coating, fibers, foams, thermoformed products, etc.

In particular, the copolymers according to the invention are suitable for the production of:

- films, either mono- or bidirectional, and multi-layer films with other polymeric materials;
- films for agricultural use such as mulching films;
- bags and liners for organic waste collection;
- mono- or multi-layer food packaging, such as for instance containers for milk, yogurt, meat, drinks, etc;
- coatings obtained with the extrusion coating technique;
- multi-layer laminates with layers of paper, plastics, aluminum, metalized films;
- expanded or expandable beads for the production of articles obtained by synthetization;
- expanded and semi-expanded products, including expanded blocks obtained from pre-expanded particles;
- expanded and thermoformed sheets and containers obtained therefrom for food packaging;
- containers in general for fruits and vegetables;
- composites with gelatinized, destructurized and/or complexed starch, natural starch, flours, other natural, vegetable or inorganic fillers, for use as filler;
- fibers, fabrics and non-woven fabrics for the sanitary and hygiene sectors;
- oil viscosizing agents for industrial use.

The biodegradable copolyester according to the invention can be prepared according to the known processes for the synthesis of polyesters. In particular, the polyester can be advantageously obtained through a polycondensation reaction wherein a first esterification or transesterification step—carried out at temperatures comprised between 180° C. and 230° C., up to the distillation of at least 85%, preferably at least 90% of the byproducts (water or monovalent alcohol)—is followed by a second deglycolation step carried out preferably at temperatures between 200° C. and 250° C. under hard vacuum, i.e. at a pressure lower than 10 mmHg, preferably lower than 5 mmHg.

Advantageously, the polymerization process of the copolyester can be carried out in the presence of a suitable catalyst. Suitable catalysts are, e.g., organometallic tin compounds, for instance the derivatives of stannoic acid, titanium compounds, for instance orthobutyltitanate, aluminum compounds, for instance triisopropyl aluminum, antimony and zinc compounds.

Advantageously, in the production process of the copolyester according to the invention, the diol is provided in the reaction system in an amount comprised between 1 and 1.5 moles per mole of diacid or ester thereof.

Among the known processes of polyester synthesis there may be also mentioned processes wherein the polymer is obtained by fermentation synthesis or genetic engineering methods.

Figure 1:
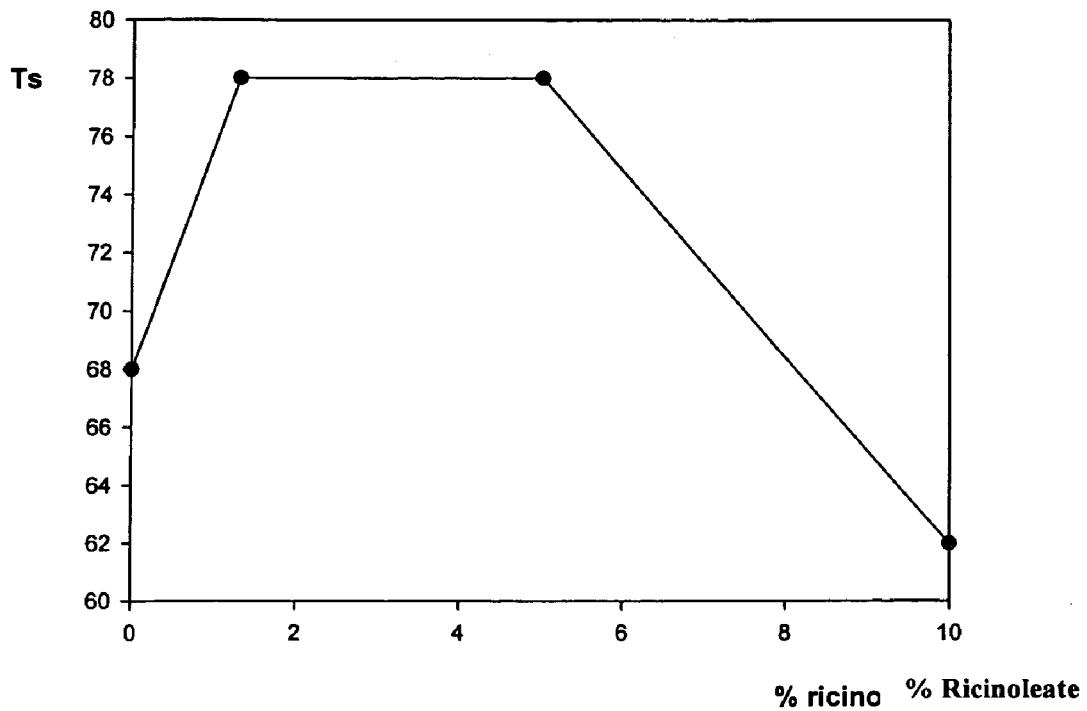
FIG. 1 is a graph of light transmission versus % of ricinoleate

Some examples of the copolyester according to the invention are now illustrated by way of mere, non exhaustive exemplification.

EXAMPLES

In the examples:

Inherent Viscosity is measured with a Ubbelohde viscosimeter at 25° C. in chloroform, at a concentration of 0.2 g/dl. The procedure is according to ASTM D 2857-89.

MFR was measured at 2.16 Kg and 150° C. according to ASTM D 1238-89.

the Gel Fraction is measured by placing a sample of polyester (X1) in chloroform (so as to prepare a solution of a concentration close to 0.02 g/cm$^3$), heating until refluxing of chloroform for 8 h, filtering the mixture on a sieve under vacuum, and weighing the weight of the material that remains on the filtering grid (X2). The gel fraction was determined as the ratio of the material so obtained with respect to the weight of the sample (X2/X1)×100.

The Acid Number was measured according to the following method. About 1–3 grams of polymer were dissolved in 10 ml of toluene and 10 ml of pyridine heating till refluxing. Then the solution was cooled to room temperature, 5 ml of water and 50 ml of THF were added and titration was carried out with a standard KOH solution. The determination was repeated without test substance (blank sample). The acid number was then found from the following formula:

$$AN = T \times 56.1 \times (V_1 - V_2)/m$$

where:
T=titer of the standard KOH solution
m=weight of the test substance in mg
$V_1$=ml of standard solution used with test substance
$V_2$=ml of standard solution used without test substance Example 1

4320 g sebacic acid (21.4 moles),
2120 g 1,4-butanediol (23.6 moles),
1000 g methyl ricinoleate (3.2 moles, >98% purity) equal to 13 mol % based on the content of sebacic acid and methyl ricinoleate
18 g glycerin (0.20 moles; 0.9 moles % based on the content of dicarboxylic acid and glycerin)
10 g monobutyl stannoic acid (corresponding to $4.8 \cdot 10^{-2}$ moles)

were added in a 25 l steel reactor provided with mechanical stirrer, nitrogen flow inlet, condenser and a connection with a vacuum pump. The temperature was gradually increased under vigorous stirring and nitrogen flow up to 210° C. The reaction was carried on until 85% of the theoretical amount of volatile byproducts was distilled (water and methanol).

The temperature was then increased to 240° C. and a pressure of 0.6 mmHg was applied to the system. The reaction was carried on for 300 min. 5.4 kg are obtained of a polymer having an inherent viscosity of 1.21 dl/g, MFR=3.2 g/10 min, Density=1.08 g/cm³. The gel fraction was 0.3%.

The product so obtained was afterwards made into a film with a Ghioldi Machine for film blowing (L/D=30; screw diameter=40 mm; thermal profile: 120–135–145×2–145×4; 45 rpm and throughput=20 kg/h); tensile properties (ASTM D882-88), tearing resistance (ASTM D1922-89) were measured, 15 days after film blowing, on the 25–30 μm film. The results are shown on Table I.

Comparative Example A 4320 g sebacic acid (21.4 moles),
2120 g 1,4-butanediol (23.6 moles),
1000 g methyl ricinoleate (3.2 moles, >98% purity) equal to 13 mol % based on the content of sebacic acid and methyl ricinoleate
40 g glycerin (0.43 moles; 2 moles % based on the content of dicarboxylic acid and glycerin)
10 g monobutylstannoic acid (corresponding to $4.8 \cdot 10^{-2}$ moles)

were added in a 25 l steel reactor provided with mechanical stirrer, nitrogen flow inlet, condenser and a connection with a vacuum pump. The temperature was gradually increased under vigorous stirring and nitrogen flow up to 210° C. The reaction was carried on until 85% of the theoretical amount of volatile byproducts was distilled (water and methanol).

The temperature was then increased to 240° C. and a pressure of 0.6 mmHg was applied to the system. After 150 min the product was crosslinked.

The gel fraction was 25%. The polyester was not processable on a film blowing machine.

Comparative Example B 4320 g sebacic acid (21.4 moles),
2120 1,4-butanediol (27.2 moles)
15.7 g glycerin (0.17 moles; 0.8 moles % based on the content of dicarboxylic acid and glycerin),
10 g monobutyl stannoic acid (corresponding to $4.8 \cdot 10^{-2}$ moles)

were added in the steel reactor of Example 1.

The temperature was gradually increased under vigorous stirring and nitrogen flow up to 210° C. The reaction was carried on until 85% of the theoretical amount of volatile byproducts was distilled (750 water). The temperature was then increased to 240° C. and a pressure of 0.6 mmHg was applied to the system. The reaction was carried on for 300 min. 5.0 kg are obtained of a polymer having an inherent viscosity of 1.17 dl/g, MFR=2.6 g/10 min, density=1.12 g/cm³.

The product so obtained was afterwards made into a film with a Ghioldi Machine for film blowing (L/D=30; screw diameter=40 mm; thermal profile: 120–135–145×2–145×4; 45 rpm and throughput=20 kg/h); tensile properties (ASTM D882-88), tearing resistance (ASTM D1922-89) were measured, 15 days after film blowing, on the 25–30 μm film. The results are shown on Table I.

With respect to the comparison example B, the copolyester according to Example 1 is less stiff and has an improved tearing resistance in the transversal direction as well as a best balancing (the break strength in the longitudinal and transversal direction of the polymer of Example 1 are, in fact, comparable).

TABLE I

|  | Example | |
| --- | --- | --- |
|  | 1 | Comp. B |
| Viscosity (dl/g) | 1.21 | 1.17 |
| MFR | 3.2 | 2.6 |
| Density (g/cm³) | 1.08 | 1.12 |
| Tensile properties - Machine Direction | | |
| Yield stress (MPa) | 10.5 | 27 |
| Stress at break (Mpa) | 23 | 37.5 |
| Yield elongation (%) | 5 | 7.5 |
| Elongation at break (%) | 290 | 325 |
| Modulus of elasticity (Mpa) | 340 | 800 |
| Energy at break (MJ/m³) | 49 | 94 |
| Tensile properties - Transv. Direction | | |
| Yield stress (MPa) | 10 | 23 |
| Stress at break (Mpa) | 14 | 18.5 |
| Yield elongation (%) | 4 | 3.6 |
| Elongation at break (%) | 595 | 80 |
| Modulus of elasticity (MPa) | 475 | 1055 |
| Energy at break (MJ/m³) | 55 | 12 |
| Tearing resistance (Elmendorf) | | |
| Longitudinal direction (N/mm) | 3 | 3 |
| Transversal Direction (N/mm) | 49 | 10 |

Comparative Example C 4320 g sebacic acid (21.4 moles),
2120 1.4-butanediol (27.2 moles)
10 g monobutyl stannoic acid (corresponding to $4.8 \cdot 10^{-2}$ moles)

were added in the steel reactor of Example 1.

The temperature was gradually increased under vigorous stirring and nitrogen flow up to 210° C. The reaction was carried on until 85% of the theoretical amount of light byproducts was distilled (750 ml water an methanol). The temperature was then increased to 240° C. and the system pressure was set at 0.6 mmHg. The reaction was continued for 300 min. 5.0 kg are obtained of a polymer having an inherent viscosity of 1.27 dl/g, MFR=3.0 g/10 min, density=1.12 g/cm$^3$.

The product so obtained was afterwards made into a film with a Ghioldi Machine for film blowing (L/D=30; screw diameter=40 mm; thermal profile: 120–135–145×2–145×4; 45 rpm and throughput=20 kg/h); elongation at break (ASTM D882-88), tearing resistance (ASTM D1922-89) were measured on the 25–30 µm film.

The polymer produced without the unsaturated acid of natural origin (Comparison Examples B and C) show, both in the presence and the absence of a branching agent (glycerin), crystallization phenomena that cause the films obtained therefrom to become brittle, with ensuing reduction in tearing resistance in both directions and elongation in the transversal direction of film blowing. This is clearly visible in the results in Table II, showing the values of mean decay calculated as the mean of mechanical properties decays in the transversal and longitudinal directions.

TABLE II

|  |  | Example 3 | | Comp. Example B | | Comp. Example C | |
|---|---|---|---|---|---|---|---|
|  |  | Time 0 | After 6 months | Time 0 | After 6 months | Time 0 | After 6 months |
| Elmendorf N/MM | Long. | 3 | 3 | 4 | 2 | 8 | 2 |
|  | Transv. | 49 | 57 | 15 | 8 | 32 | 13 |
|  | Mean decay % | +8 | | −48 | | −67 | |
| Elongation at break | Long. | 290 | 290 | 320 | 320 | 320 | 570 |
|  | Transv. | 595 | 400 | 200 | 40 | 40 | 100 |
|  | Mean decay % | −16 | | −40 | | −39 | |

Example 2

202 g sebacic acid (1 mole)

100 g 1,4-butanediol (1.1 mole)

46.8 g methyl ricinoleate (0.13 moles; purity=85% wt) (obtained by base catalized transesterification reaction of castor oil and subsequent removal of glycerin—a byproduct of the reaction—and excess methanol) equal to 13% moles based on the content of sebacic acid and methyl ricinoleate.

1.2 g glycerin (1.3·10$^{-2}$ moles; 1.3% moles based on the content of dicarboxylic acid and glycerin).

were added in a 1.5 it Pirex glass conic reactor provided with mechanical stirrer, nitrogen flow inlet, condenser and a connection with a vacuum pump.

The temperature was gradually increased under vigorous stirring and nitrogen flow up to 210° C. The reaction was continued until 88% of the theoretical amount of volatile byproducts was distilled. Then 0.25 g of aluminum isopropoxide were added.

The temperature was then increased to 240° C. and the system was set at a pressure of 0.5 mmHg. The reaction was carried on for 360 min. 250 g of a polymer having an inherent viscosity of 1.2 dl/g, MFR=5 g/10 min, and density=1.08 was obtained.

The Gel Fraction was 0.4%.

Example 3

5000 g sebacic acid (24.8 moles), 2450 g 1,4-butanediol (23.6 moles), 460 g ricinoleic acid (purity 84% wt)—1.3 mole, equal to 5 mol % based on the content of sebacic acid and ricinoleic acid 12.3 g glycerin—0.13 moles, equal to 0.5 moles % based on the content of dicarboxylic acid and glycerin.

6.6 g monobutyl stannoic acid were added in a 25 l steel reactor provided with mechanical stirrer, nitrogen flow inlet, condenser and a connection with a vacuum pump. The temperature was gradually increased under vigorous stirring and nitrogen flow up to 210° C. The reaction was carried on until 85% of the theoretical amount of volatile byproducts was distilled (water).

The temperature was then increased to 240° C. and a pressure of 0.6 mmHg was applied to the system. The reaction was carried on for 210 min. A polymer having an inherent viscosity of 1, 18 dl/g, MFR=3.6 g/10 min, density=1.10 g/cm$^3$, an Acid Number of 1.6 mgKOH/g was obtained.

The product so obtained was afterwards film blown with a Formac Machine L/D=25 screw diameter=20 mm; thermal profile: 60–110–120–130–135° C.; 35 rpm and throughput=2.1 kg/h);.

The water vapor transmission rate was measured (ASTM E 96-90) on the 27–33 µm film, obtaining a value of 890

$$\frac{g \cdot 30 \ \mu m}{m^2 \cdot 24h}$$

Comparative Example D 5000 g sebacic acid (24.8 moles), 2450 g 1,4-butanediol (23.6 moles), 12.3 g glycerin—0.13 moles, equal to 0.5 moles % based on the content of dicarboxylic acid and glycerin.

6.6 g monobutyl stannoic acid were added in a 25 l steel reactor provided with mechanical stirrer, nitrogen flow inlet, condenser and a connection with a vacuum pump. The temperature was gradually increased under vigorous stirring and nitrogen flow up to 210° C. The reaction was carried on until 85% of the theoretical amount of volatile byproducts was distilled (water). The temperature was then increased to 240° C. and a pressure of 1.5 mmHg was applied to the system. The reaction was carried on for 240 min.

A polymer having an inherent viscosity of 1.2 dl/g, MFR=3.1 g/10 min, density=1.12 g/cm$^3$, an Acid Number of 1.5 mgKOH/g, was obtained.

The product so obtained was afterwards film blown with a Formac Machine L/D=25 screw diameter=20 mm; thermal profile: 60–110–120–130–135° C.; 35 rpm and throughput=2.1 kg/h);.

The water vapor transmission rate was measured (ASTM E 96-90) on the 27–33 µm film, obtaining a value of 670

$$\frac{g \cdot 30 \ \mu m}{m^2 \cdot 24h}.$$

Example 4

4000 g sebacic acid (19.8 moles),
1960 g 1,4-butanediol (21.8 moles),
93.4 g of castor oil (content of ricinoleic unit 88% wt)—corresponding to 0.26 mol of ricinoleic acid (equal to 1.3 moles % based on the content of dicarboxylic acid and ricinoleic acid) and 0.1 mol of glycerin (equal to 0.5 moles % based on the content of dicarboxylic acid and glycerin)
6.0 g monobutyl stannoic acid were added in a 25 l steel reactor provided with mechanical stirrer, nitrogen flow inlet, condenser and a connection with a vacuum pump. The temperature was gradually increased under vigorous stirring and nitrogen flow up to 210° C. The reaction was carried on until 85% of the theoretical amount of volatile byproducts was distilled (water).

The temperature was then increased to 240° C. and a pressure of 0.6 mmHg was applied to the system. The reaction was carried on for 120 min. A polymer having an inherent viscosity of 1.25 dl/g, MFR=1.6 g/10 min, density=1.12 g/cm$^3$ obtained.

Example 5

4000 g sebacic acid (24.8 moles),
1960 g 1,4-butanediol (23.6 moles),
809 g methyl ricinoleate (purity 88%)—2.3 mol equal to 10 mol % based on the content of sebacic acid and methyl ricinoleate
10.1 g glycerin—0.11 moles equal to 0.5% based on the content of dicarboxylic acid and glycerin
6.0 g monobutyl stannoic acid were added in a 25 l steel reactor provided with mechanical stirrer, nitrogen flow inlet, condenser and a connection with a vacuum pump. The temperature was gradually increased under vigorous stirring and nitrogen flow up to 210° C. The reaction was carried on until 85% of the theoretical amount of volatile byproducts was distilled (water and methanol).

The temperature was then increased to 240° C. and a pressure of 0.6 mmHg was applied to the system. The reaction was carried on for 150 min. A polymer having an inherent viscosity of 1.17 dl/g, MFR=4.9 g/10 min, density=1.09 g/cm$^3$ was obtained.

The products obtained in the examples 3–5 and comparative example D were afterwards film blown with a Formac Machine (L/D=25 screw diameter=20 mm; thermal profile: 60–110–120–130–135° C.; 35 rpm and throughput=2.1 kg/h).

Figure 2:
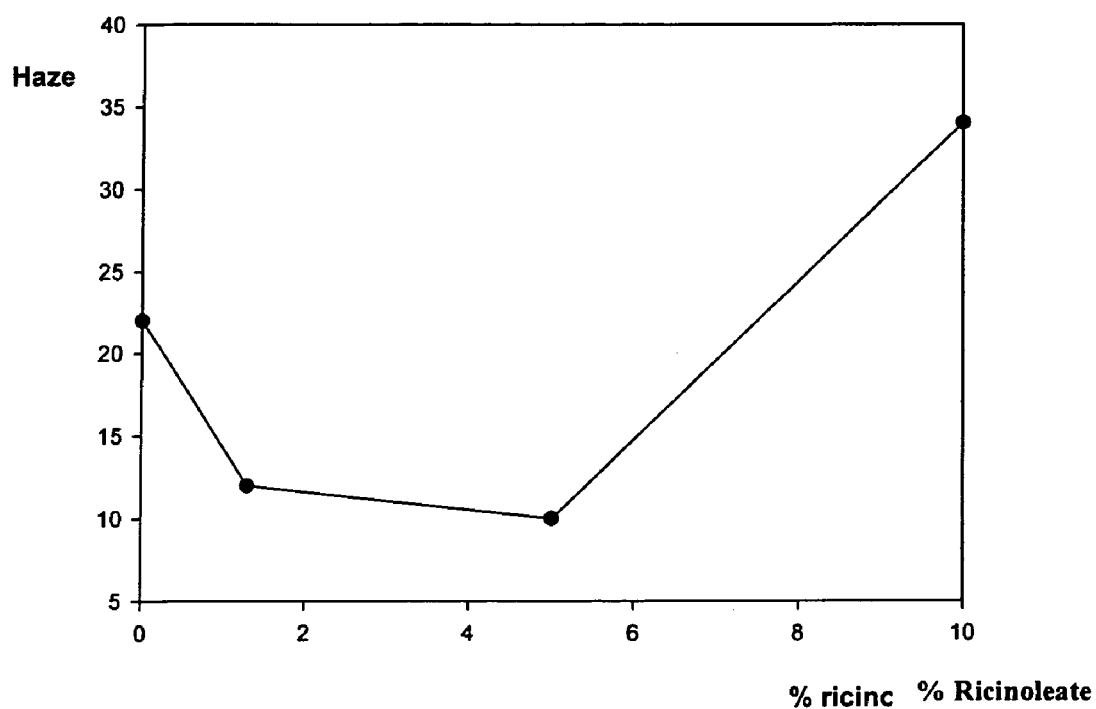
FIG. 2 is a graph of haze versus % ricinoleate

Haze and light transmittance at the source port (Ts) (ASTM D1003) were measured on the 27–33 μm film, 15 days after film blowing. The results are summarized in table III and FIGS. 1 and 2

Products containing from 0.5 up to 6% of ricinoleate units show better optical properties than product obtained without ricinoleate units or with amounts of ricinoleate units exceeding the upper range above.

TABLE III

|  | Comparative example D | Ex. 4 | Ex. 3 | Ex. 5 |
|---|---|---|---|---|
| Ricinoleate % | 0 | 1.3% | 5% | 10% |
| Thickness μm | 29 | 27 | 27 | 33 |
| Haze % | 22 | 12 | 10 | 34 |
| Ts % | 68 | 78 | 78 | 62 |

The invention claimed is:

1. A thermoplastic biodegradable aliphatic copolyester having unsaturation and comprising units derived from the following monomers:
   a) an aliphatic dicarboxylic acid, or esters thereof, with 2–20 C atoms;
   b) a diol, either aliphatic or cycloaliphatic, with 2–20 C atoms;
   c) an unsaturated acid derived from vegetable oils or esters thereof;
   d) a branching agent selected from molecules having at least three functional groups;
   wherein said branching agent is present in an amount within the range of from 0.05 to 1.5% by moles, based on the sum of the moles of said branching agent and the moles of said aliphatic dicarboxylic acid or esters thereof.

2. Biodegradable copolyester according to claim 1, characterized in that said unsaturated acid derived from vegetable oils is present in an amount up to 40% by moles based on the sum of the moles of said unsaturated acid and the moles of said aliphatic dicarboxylic acid or esters thereof.

3. Biodegradable copolyester according to claim 2, characterized in that said unsaturated acid derived from vegetable oils is present in an amount up to 15% by moles based on the sum of the moles of said unsaturated acid and the moles of said aliphatic dicarboxylic acid or esters thereof.

4. Biodegradable copolyester according to claim 3, characterized in that said unsaturated acid derived from vegetable oils is present in an amount of from 0.5 to 6% by moles based on the sum of the moles of said unsaturated acid and the moles of said aliphatic dicarboxylic acid or esters thereof.

5. Biodegradable copolyester according to claim 1, characterized by an inherent viscosity within the range of 0.3 to 1.5 dl/g.

6. Biodegradable copolyester according to claim 5, characterized by a Melt Flow Rate within the range of 0.5 to 150 g/10 mm.

7. Biodegradable copolyester according to claim 6, characterized by a density lower than 1.25 g/cm$^3$.

8. Biodegradable copolyesters according to claim 1, characterized by a gel fraction lower than 5%.

9. Biodegradable copolyester according to claim 1, characterized in that said aliphatic dicarboxylic acid is selected from the group comprising oxalic acid, malonic acid, succinic acid, glutaric acid, adipic acid, pimelic acid, suberic acid, azelaic acid, sebacic acid, undecandioic acid, dodecandioic acid and brassylic acid.

10. Biodegradable copolyester according to claim 9, characterized in that said aliphatic or cycloaliphatic diol is selected from the group comprising 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tiridecandiol, 1,4-cyclohexandimethanol, neopentylglycol, 2-methyl-1,3-propandiol, dianhydrosorbitol, dianhydromannitol, dianhydroiditol, cyclohexandiol, cyclohexanmethandiol.

11. Biodegradable copolyester according to claim 10, characterized in that said unsaturated acid of natural origin is a monounsaturated hydroxy acid or a mono- or polyunsaturated monocarboxylic acid.

12. Biodegradable copolyester according to claim 11, characterized in that said unsaturated acid of natural origin is selected from the group comprising ricinoleic acid, lesquerolic acid, oleic acid, erucic acid, linoleic acid, linolenic acid.

13. Biodegradable copolyester according to claim 9, characterized in that said aliphatic dicarboxylic acid is a saturated acid with from 9 to 13 carbon atoms.

14. Biodegradable copolyester according to claim 1, characterized by further comprising at least one hydroxy acid in an amount up to 30% moles based on the moles of the dicarboxylic aliphatic acid or esters thereof.

15. Biodegradable copolyester according to claim 14, characterized in that said hydroxyacid is selected from the group comprising glycolic acid, hydroxybutirric acid, hydroxycaproic acid, hydroxyvaleric acid, 7-hydroxyeptanoic acid, 8-hydroxycaproic acid, 9-hydroxynonanoic acid, lactic acid.

16. Biodegradable copolyester according to claim 1, characterized by comprising up to 50% moles-based on the content of dicarboxylic acid and of any other acid present in the chain-of a polyfunctional aromatic compound.

17. Biodegradable copolyester according to claim 16, characterized in that said polyfunctional aromatic compound is selected from the group consisting of phthalic acids, in particular tereplithalic acid, bisphenol A, hydroquinone.

18. Biodegradable copolyester according to claim 1, characterized in that said branching agent is selected from the group comprising glycerol, pentaerythritol, trimethylolpane, citric acid, densipolic acid, auripotic acid, epoxidized soybean oil and caster oil.

19. Biodegradable copolyester blend characterized by comprising the copolyester according to claim 1 with other biodegradable polyesters or polymers other than polyesters.

20. Biodegradable copolyester blend according to claim 19, further comprising one or more of starch, cellulose, chitosan, alginates or natural rubbers.

21. Biodegradable copolyester blend according to claim 20, wherein said starch or cellulose is modified or said starch is in a destructurized, gelatinized form or filler form.

22. Biodgradable copolyester according to claim 1, upgraded through reactive blending, modified through the introduction of different functional groups or submitted to cross-linking processes by means of UV and visible spectrum radiation.

23. Process for the production of a biodegradable copolyester according to claim 1, characterized by comprising a first esterification or transesterification step, and a second vacuum-deglycolization step in the presence of a catalyst.

24. Process according to claim 23, wherein the catalyst is an organometallic compound.

25. Process according to claim 24, wherein the esterification or transesterification step is carried out at ambient pressure and temperatures within the range of 180° C. to 230° C. until distillation of at least 85% byproducts.

26. Process according to claim 25, wherein the deglycolation step is carried out in a dynamic vacuum and at temperatures within the range from 220 to 250° C.

27. Process according to claim 26, wherein the amount of diol used is within the range of 1 to 1.5 moles per mole of dicarboxylic acid or ester thereof.

28. Shaped articles obtained from the biodegradable copolyester or the biodegradable copolyester blend of claim 1.

29. Shaped articles according to claim 28, wherein said articles are selected from the group consisting of films, either mono- or bidirectional, multi-layer films with other polymeric materials, and mulching films.

30. Shaped articles according to claim 28, wherein said articles are selected from bags and liners for organic waste collection.

31. Shaped articles according to claim 28, wherein said articles are selected from the group consisting of mono- or multi-layer food containers milk containers, yogurt containers, meat containers, drinks containers, fruit containers, and vegetables containers.

32. Shaped articles according to claim 28, wherein said articles are coatings obtained by extrusion coating technique.

33. Shaped articles according to claim 28, wherein said articles are multi-layer laminates comprising a layer of a material selected from the group consisting of paper, plastics, aluminum, and metallized films.

34. Shaped articles according to claim 28, wherein said articles are selected from the group consisting of expanded products, semi-expanded products, expanded blocks from pre-expanded particles, expanded sheets, thermoformed sheets and containers for food packaging obtained therefrom.

35. Shaped articles according to claim 28, wherein said articles are selected from the group consisting of composites with gelatinized, destructurized and/or complexed starch, natural starch, flours, vegetable and inorganic fillers.

36. Shaped articles according to claim 28, wherein said articles are selected from the group consisting of fibers, fabrics and non-woven fabrics for the sanitary and hygiene sectors.

37. Biodegradable copolyesters according to claim 1, characterized by a gel fraction lower than 2.5%.

38. Biodegradable copolyesters according to claim 1, characterized by a gel fraction lower than 1%.

39. Shaped articles according to claim 29, wherein said films are for agricultural use.

40. A composition for industrial use comprising as an oil viscosizing agent a copolyester according to claim 1.

41. Biodegradable copolyester according to claim 1 being free of any hydroxyacid or containing a hydroxyacid in an amount up to 50% by moles based on the moles of said dicarboxylic acid.

* * * * *